(12) United States Patent
Golan et al.

(10) Patent No.: US 9,875,238 B2
(45) Date of Patent: Jan. 23, 2018

(54) SYSTEMS AND METHODS FOR ESTABLISHING A LANGUAGE TRANSLATION SETTING FOR A TELEPHONY COMMUNICATION

(71) Applicant: VONAGE AMERICA INC., Holmdel, NJ (US)

(72) Inventors: Yuval Golan, Rishon le Zion (IL); Gil Osher, Marietta, GA (US)

(73) Assignee: VONAGE AMERICA INC., Holmdel, NJ (US)

(*) Notice: Subject to any disclaimer, the term of this patent is extended or adjusted under 35 U.S.C. 154(b) by 0 days.

(21) Appl. No.: 15/072,143

(22) Filed: Mar. 16, 2016

(65) Prior Publication Data
US 2017/0270103 A1 Sep. 21, 2017

(51) Int. Cl.
| | |
|---|---|
| G06F 17/28 | (2006.01) |
| G06F 17/30 | (2006.01) |
| H04W 4/02 | (2009.01) |
| G10L 15/00 | (2013.01) |

(52) U.S. Cl.
CPC ...... *G06F 17/289* (2013.01); *G06F 17/30864* (2013.01); *G10L 15/005* (2013.01); *H04W 4/02* (2013.01)

(58) Field of Classification Search
CPC .................................................. G10L 15/005
See application file for complete search history.

(56) References Cited

U.S. PATENT DOCUMENTS

| | | | | |
|---|---|---|---|---|
| 5,440,615 A * | 8/1995 | Caccuro | ................ | H04M 3/533 379/207.01 |
| 5,701,497 A * | 12/1997 | Yamauchi | .......... | H04N 1/00127 358/403 |
| 6,161,082 A * | 12/2000 | Goldberg | .............. | G06F 17/289 704/3 |
| 2001/0034599 A1 * | 10/2001 | Kage | ...................... | G06Q 30/02 704/3 |
| 2002/0022498 A1 * | 2/2002 | Hokao | .............. | H04M 1/72519 455/414.4 |
| 2004/0122677 A1 * | 6/2004 | Lee | ........................ | G06F 17/289 704/277 |
| 2004/0192258 A1 * | 9/2004 | Atkin | .................. | H04L 12/1845 455/412.1 |
| 2005/0114114 A1 * | 5/2005 | Rudolph | ............. | G06F 17/2735 704/10 |
| 2009/0125295 A1 * | 5/2009 | Drewes | ................. | G06F 17/289 704/3 |

(Continued)

FOREIGN PATENT DOCUMENTS

WO   WO 9923837 A2 *   5/1999   .......... G06F 17/289

*Primary Examiner* — Brian Albertalli
(74) *Attorney, Agent, or Firm* — Nixon & Vanderhye P.C.; Joseph Pagnotta

(57) ABSTRACT

Systems and methods for establishing a language translation setting for a telephony communication determine whether first and second parties to the telephony communication are likely to speak different languages. If so, one or both parties are queried to determine if they would like a language translation to be performed. One or both parties' response to that query is used to establish a language translation setting for the telephony communication. If one or both parties request a translation, some form of real-time translation may then be provided.

23 Claims, 6 Drawing Sheets

(56) References Cited

U.S. PATENT DOCUMENTS

2010/0185434 A1* 7/2010 Burvall ............... G06F 17/289
　　　　　　　　　　　　　　　　　　　　704/3
2013/0304457 A1* 11/2013 Kang .................... G10L 13/00
　　　　　　　　　　　　　　　　　　　　704/201

* cited by examiner

SYSTEMS AND METHODS FOR ESTABLISHING A LANGUAGE TRANSLATION SETTING FOR A TELEPHONY COMMUNICATION

BACKGROUND OF THE INVENTION

The invention is related to providing translation services for a telephony communication.

When a first party sets up a telephony communication with a second party, it is now possible to obtain language translation services from a telephony service provider that is setting up the telephony communication. Unfortunately, many people are unaware that such translation services even exists. Because the individuals setting up telephony communications do not know that translations services are available, they do not know to request the translation services.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
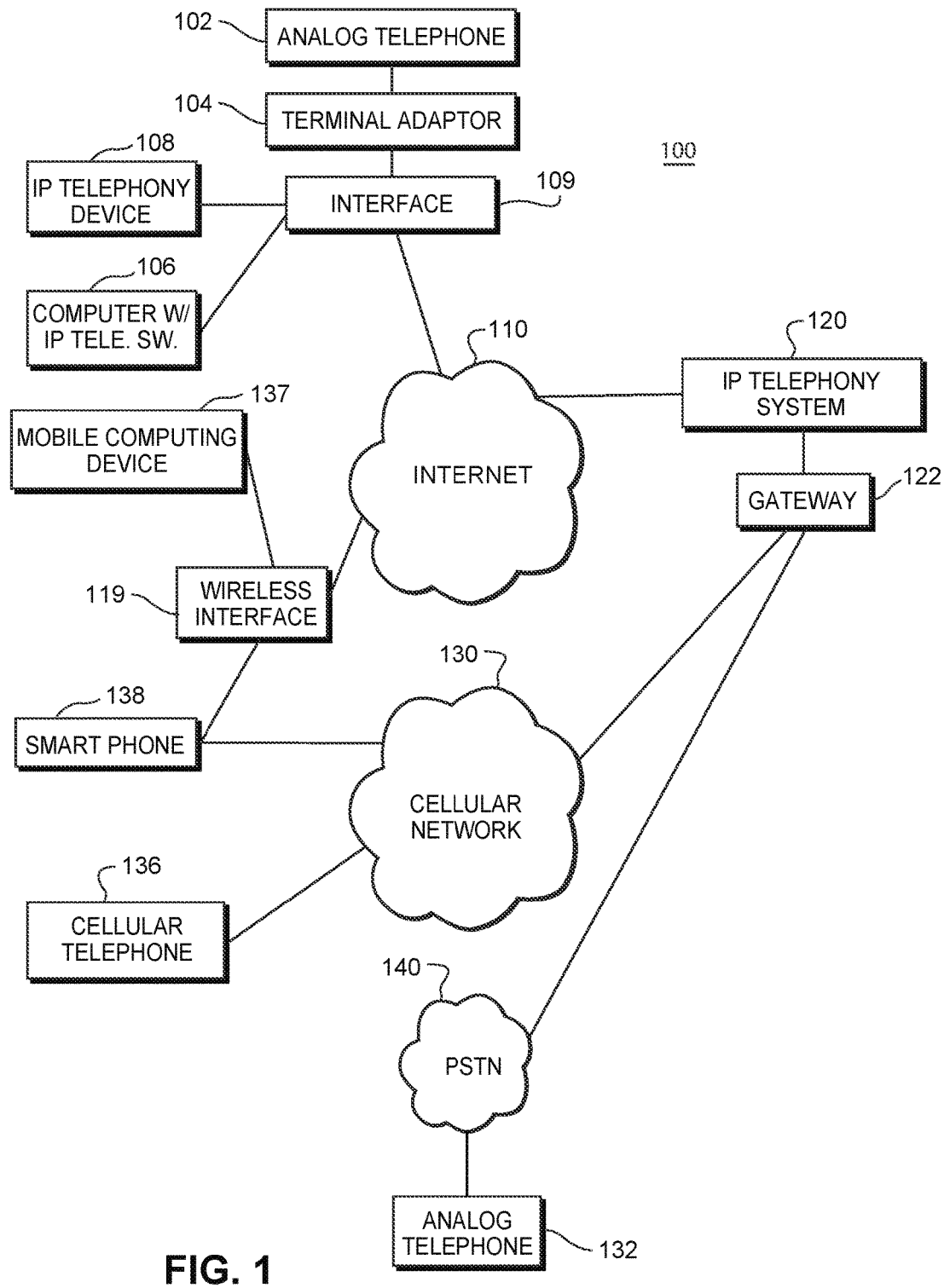
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

Figure 2:
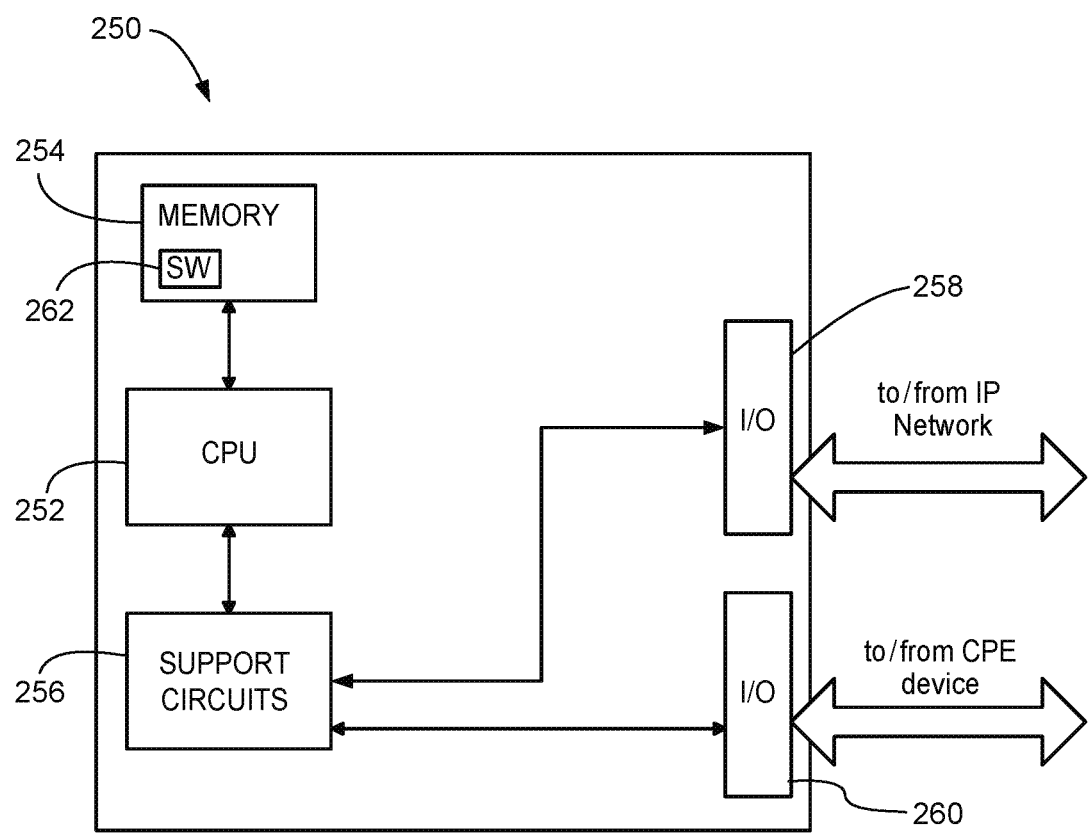
FIG. 2 is a diagram of various elements of a processor that forms part of an IP telephony system and/or part of a language translation setting unit and/or user's telephony device.

FIG. 2 illustrates elements of a computer processor 250 that can be used as part of the IP telephony system 120, as part of a language translation setting unit, or as part of a user's telephony device, to accomplish various functions. An IP telephony system 120, a language translation setting unit and a telephony device could all include multiple processors 250, along with their respective operating components and programming, each carrying out a specific or dedicated portion of the functions performed by the IP telephony system 120, by the language translation setting unit, or by the telephony device.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, a language translation setting unit and/or a user's telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to a "telephony device." This term is used to refer to any type of device which is capable of interacting with a telephony system to conduct or participate in a telephony communication. This includes traditional analog telephones, cellular telephones, IP telephones configured to conduct telephony communications via IP data communications, as well as other computing devices which can be configured to conduct telephony communications via data communications, such as a computer running IP telephony software. Because various different computing devices can be configured to conduct telephony communications via a data network, a single device might be capable of operating as both a computing device and as a telephony device.

Certain devices that are not traditionally used as telephony devices may act as telephony devices once they are configured with appropriate client software. One example would be a desktop or a laptop computer that is running software that can interact with an IP telephony system over a data network to conduct telephone calls. Another example would be a portable computing device, such as an Apple iPod Touch™ or an Apple iPad™, which includes a speaker and a microphone. A software application loaded onto an Apple iPad™ can be run so that the Apple iPad™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
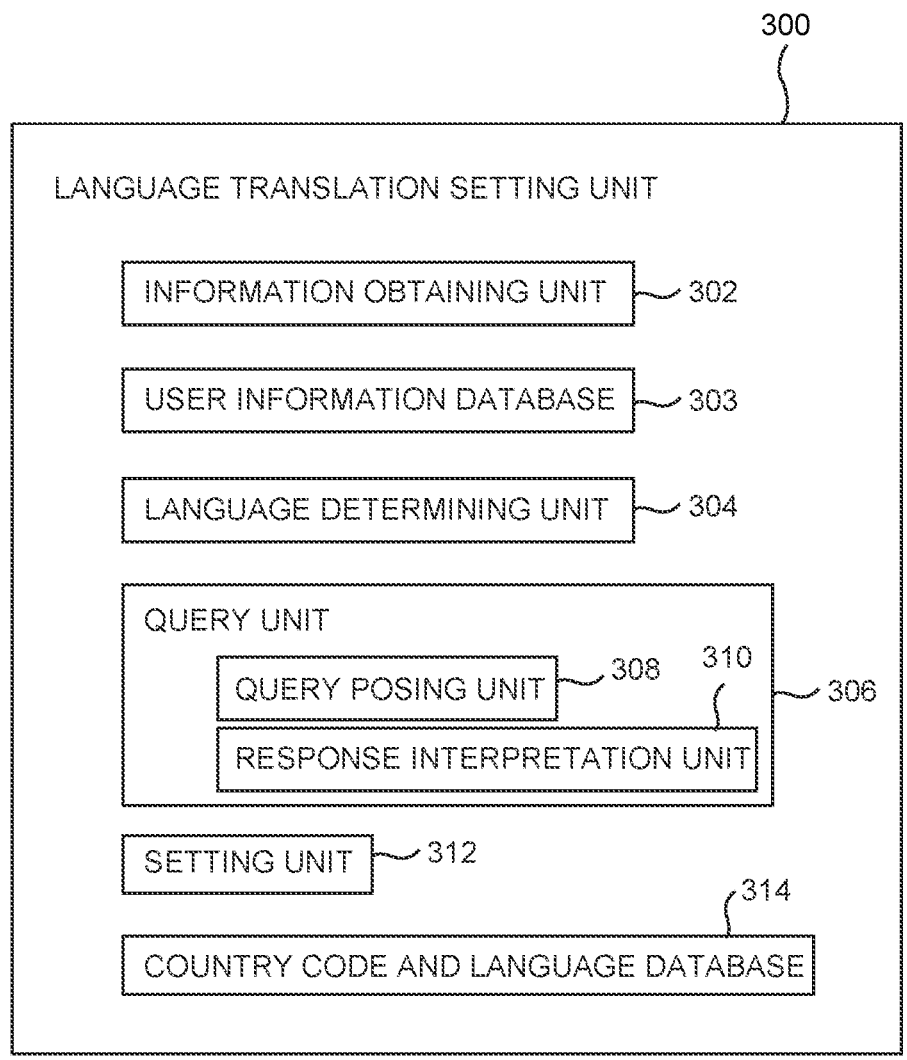
FIG. 3 is a block diagram illustrating elements of a language translation setting unit.

FIG. 3 illustrates elements of a language translation setting unit 300. The language translation setting unit 300 is configured to determine whether two parties to a telephony communication are likely to speak different languages. If so, the language translation setting unit 300 asks one or both parties whether they would like a language translation to be performed as the telephony communication occurs. If the parties respond positively, then some form of language translation service is provided. The form of the language translation could vary depending upon various features or settings which are available to the users.

Although language translation services are currently available through many telephony service providers, most users are unaware of this fact. The language translation setting unit 300 is configured to automatically determine when two parties to a telephony communication are likely to speak a different language. In that instance, the language translation setting unit 300 automatically poses a query to at least one of the parties to determine if the party would like translation services to be provided for the telephony communication. By automatically posing such a query, users who are unaware that translation services exist are notified of the existence of the translation services. In addition, if the party asks for translation services, the telephony service provider may earn a fee for providing the service.

Ideally, a query is only posed to a party to the telephony communication if it appears that the two parties to the telephony communication are likely to speak different languages. This prevents the automatic queries from becoming annoying to users. However, to operate in this manner, the language translation setting unit must be capable of determining if the two parties are likely to speak different languages.

The language translation setting unit 300 includes an information obtaining unit 302, which obtains information about the first and second parties to a telephony communication. The obtained information is designed to allow the language translation setting unit 300 to determine whether or not the parties are likely to speak different languages. In some instances, the information obtaining unit 302 may obtain information directly from the first and second telephony devices which are being used to conduct the telephony communication. The obtained information could be information about time zone settings of the first and second telephony devices, as the time zone settings could be indicative of the locations of the first and second telephony devices, which in turn can be indicative of the languages spoken by the parties that use the first and second telephony devices.

Alternatively, the information obtaining unit 302 could obtain information about a language setting of an operating system or a software application that is resident on either of the first and second telephony devices that are being used to conduct the telephony communication. The language setting of the operating system or a software application would be indicative of the language spoken by party using the telephony device.

The information obtaining unit 302 could also obtain information about the physical locations of the first and second telephony devices. This could include obtaining latitude and longitude values from a global positioning system (GPS) unit of a telephony device. The latitude and longitude values would then allow the information obtaining unit to determine the current country location of a telephony device, and thus the language likely spoken by a user of the telephony device.

In some embodiments, the information obtaining unit 302 could simply acquire a telephone number assigned to a telephony device. The telephone number, and/or a country code or area code of a telephone number could then be indicative of the home country of the telephony device, and thus a language likely spoken by a user of the telephony device. The leading digit or digits of the telephone number typically comprise a country code, which could indicate the language spoken by a user. Likewise, an area code portion of a telephone number could identify a specific area within a country where the user's telephone is located, or at least where the user was originally located when he obtained the telephone number assigned to his telephone. This information could be helpful in determining the language likely spoken by the user in countries where more than one language is commonly spoken, such as in Canada.

In alternate embodiments, the information obtaining unit 302 could obtain various other items or forms of information relating either to the first and second telephony devices themselves, or to the first and second users, respectively, of the telephony devices in order to determine the languages that are likely spoken by the users. For example, the information obtaining unit 302 may be able to access information about a user of a telephony device which is contained in a user profile maintained by the telephony service provider that provides the telephony device with its telephony service. For example, if the user has an Apple iPhone, the language setting associated with the Siri assistant could be accessed to determine the language spoken by the user. Similarly, a user profile associated with an IP telephony software application on a telephony device could include information about the language or languages the user speaks.

The language translation setting unit 300 also includes a language determining unit 304 which determines whether first and second parties that use first and second telephony devices that will conduct a telephony communication are likely to speak different languages. The language determining unit 304 may determine the language likely spoken by the first party that uses the first telephony device, and the language likely spoken by the second party that uses the second telephony device based on the information obtained by the information obtaining unit 302. The language determining unit 304 may also use information in a user information database 303 to determine if two parties to a telephony communication likely speak the same language. If the languages likely spoken by the first and second parties are the same, then it is not likely that the parties would require a translation. However, if the language likely spoken by the first party is different than the language likely spoken by the second party, then a query unit 306 of the language translation setting unit 300 may automatically send a query to one or both parties to ask if they would like to receive translation services for the telephony communication.

The language determining unit 304 may be configured to use the information obtained by the information obtaining unit 302 in various different fashions. For example, in some embodiments the language determining unit 304 may assume that the same language is spoken by all people located within the same country. However, in different embodiments the language determining unit 304 may be configured to provide a greater degree of specificity in identifying multiple individual languages that are spoken within the same country.

For example, if the language determining unit 304 learns that a telephony device is currently located in Canada, the user of the telephony device might speak English or French. The language determining unit 304 could then look at the exact location of the telephony device as reported by a GPS unit of the telephony device. Alternatively, the area code portion of a telephone number assigned to a user's telephony device may provide an indication of the user's location within a country. If the telephony device is currently located in a province of Canada that predominantly speaks English, the language determining unit 304 would determine that the user of the device likely speaks English. However, if the telephony device is located in a province of Canada that speaks French, the language determining unit could determine that the user of the telephony device likely speaks French. Because the predominant language spoken in different provinces of Canada is different, the likely language determined by the language determining unit 304 could change depending upon which province the telephony device is presently located within.

The language translation setting unit 300 also includes a user information database 303. The information stored in the user information database 303 includes information about the language or languages spoken by various different individuals. There may be entries for all the users of a particular telephony service provider, and also entries for individuals who are not users of a telephony service provider, but who have conducted telephony communications in the past through the telephony service provider.

The information about languages spoken by individuals listed in the user information database 303 can be acquired from the individuals themselves, from previous interactions with the individuals that occurred when the individuals were conducting some form of telephony activity, and/or from other alternate sources. For example, a telephony services provider may acquire information about the languages spoken by its users when the users first sign up for service. This language information is then recorded in the user information database 303, and the information is later made available to the language determining unit 304 when the language determining unit 304 is determining whether two parties to a telephony communication likely speak the same language.

The information in the user information database 303 is not limited, however, to information about users of a particular telephony system. If a telephony system user engages in a telephony communication with an individual who is not a regular user of the telephony system, information about language preferences for that individual may still be stored in the user information database 303. If a telephony communication is later setup between that individual and another user of the telephony system, information about the individual's language preferences can be obtained from the user information database 303 to help determine if a translation may be necessary.

Also, if the language determining unit 304 became involved in the setup of a new telephony communication for a particular individual at some point in the past, and obtained information about a language or languages spoken by that individual as a result, information about that language or languages could have been stored in the user information database 303 at that time. When the language determining unit 304 becomes involved in a subsequent attempt to setup a new telephony communication for the same individual, the language determining unit 304 could access the language information for that individual now stored in the user information database 303.

An individual's entry in the user information database could be indexed against multiple different items of information, which would make it possible to locate that individual's entry using multiple different items of information. For example, the entry could be indexed against the individual's name, against one or more telephone numbers associated with the individual, against an identification number of a user account with a telephony services provider, against an identification number associated with a telephony services software application that is resident on a user's telephony device, or against other identifying information. As a result, when a new telephony communication is being setup for an individual, and if the information obtaining unit 302 or the language determining unit 304 is able to obtain any one of these items of information for the individual, that information could be used to locate the individual's record in the user information database 303, and thus, potentially, the language or languages spoken by the individual.

Because it may be easiest and fastest to determine a language or languages spoken by an individual using information in the user information database 303, as opposed to other means, the language determining unit 304 may first attempt to locate and access an individual's entry in the user information database 303 before attempting to determine the language or languages spoken by the individual using information obtained from the information obtaining unit 302. However, it may be necessary to first obtain some key item of information about the individual from the information obtaining unit 302 in order to locate the individual's entry in the user information database 303. For example, when a telephony system is setting up a new telephony communication for an individual, the telephone number of the telephony device being used by the individual may be obtained by the information obtaining unit 302, and that information is then passed to the language determining unit 304. The language determining unit 304 then uses the obtained telephone number to locate an entry in the user information database 303. If the entry in the user information database 303 includes information about the language or languages spoken by the individual, that language information could then be used to determine if the two parties to the telephony communication likely speak the same language. Alternatively, if there is no entry for the individual in the user information database 303, or if an entry for the individual does not include information about the language or languages spoken by the individual, then the language determining unit 304 can try to determine the language or languages spoken by the individual via some alternate method.

In some embodiments, a particular individual's spoken communications may be monitored to determine the language or languages spoken by the individual. The individual's entry in the user information database 303 may then be updated accordingly. Thus, information in the user information database 303 about the languages or languages spoken by an individual may be based on direct or automatic observations of the individual's spoken or written communications.

In situations where a user speaks multiple languages, information in the user information database 303 may include information about preferred languages. Also, information in the user information database 303 may indicate that although first and second individuals both speak first and second languages, when the two individuals are speaking to each other, they prefer to speak the first language. This information could be obtained from responses to queries that have been received in the past, from preference information provided by the individuals themselves, or by direct or automatic monitoring of user communications.

The query unit 306 of the language translation setting unit 300 is configured to pose a query to either or both of the parties that use the first and second telephony devices which conduct a telephony communication. The query unit 306 includes a query posing unit 308 that is configured to pose queries to one or both parties. The query unit 306 also includes a response interpretation unit 310 which is configured to interpret a response which is provided by either or both of the parties in response to a query.

If the language determining unit 304 determines that the languages likely spoken by the first and second parties are different, then in many cases the query posing unit 308 poses a query to one or both of the parties asking if they would like to be provided with language translation services. In many instances, the query posing unit 308 would pose this query only to the party initiating the telephony communication. However, in some embodiments the query posing unit 308 may pose queries to both the party that initiated the telephony communication, and the party that is receiving the telephony communication. In yet other embodiments, the query posing unit 308 could pose a query to only the party that is receiving the telephony communication.

In some embodiments, the query posing unit 308 is configured to pose a query to a party in the language that the party likely speaks, as determined by the language determining unit 304. If the query posing unit 308 poses a query both to the party initiating the telephony communication, and the party receiving the telephony communication, then the queries posed to the first and second parties would be posed in the languages likely spoken by the first and second parties, respectively, as determined by the language determining unit 304.

The response interpretation unit 310 is configured to interpret responses provided by the parties in response to queries. The response interpretation unit could be configured to interpret the dual tone multi-frequency (DTMF) tones which are produced when a user depresses individual buttons on a telephony device keypad. In other embodiments, the response interpretation unit 310 is configured to receive and interpret spoken responses to queries. If the response interpretation unit 310 is configured to interpret spoken responses, the response interpretation unit 310 could include speech recognition capabilities, or the response interpretation unit 310 could utilize the services of a separate speech recognition unit.

Ultimately, the response interpretation unit 310 analyzes a party's response to a query and determines whether or not one or both parties wishes for translation services to be provided. The analyzed response may also specify what type of translation services are to be provided.

The setting unit 312 of the language translation setting unit 300 sets a language translation setting for the telephony communication based on the analyzed responses to queries posed by the query unit 306. The language translation setting could indicate that language translation services are to be provided, and specifically what type of translation services are to be provided. Typically, the language translation setting would indicate at least the two languages spoken by each of the first and second parties. This information would then be used to provide the language translation services for the telephony communication.

The language translation services that are provided could take many different forms. For example, in some embodiments the spoken audio input in a first language received from the first party is converted into translated audio in a second language that is played to the second party, and vice versa. In some embodiments, the spoken audio input provided by the first party could be converted into text in the first language, the text is translated into text in the second language, and the text in the second language is then be converted back into a spoken audio stream in the second language which is played to the second party. The same process is followed in reverse to play translated audio to the first party in the first language.

In alternate embodiments, spoken audio input provided by the first party in a first language could be converted into text in a second language, and that test in the second language could be provided to the second party in various different ways. In some embodiments, the translated text could be presented to the second party via a display screen of the second party's telephony device. In alternate embodiments, the translated text in the second language could be sent to the second party via an email message, via a SMS message, or via some other delivery mechanism.

In some embodiments, a real-time transcription of the words spoken by one or both of the parties could be presented to one or both of the parties via a display screen available to the party. This could be the display screen of the user's telephony device, or perhaps a display screen of a separate computing device which can be used to display the transcription. The transcription provided to one party could include only the translated text of what the other party is saying. Alternatively, the transcription could include text which reflects what both parties are speaking. In this case, the text would be presented to each user in the language that they speak.

The setting unit 312 may also use information stored in the user information database 303 to establish a language translation setting for a communication. The user information database 303 may include information about a preferred language translation setting for an individual user, or for a communication that is to occur between any two individuals. For example, information recorded in the user information database 303 may indicate when a first individual and a second individual conducted a telephony communication in the past, they requested a translation from a first language to a second language. When such information is available, the setting unit may automatically establish a language translation setting for a new communication that is being setup between the first and second individuals, the language translation setting indicating that once again a translation from the first to the second languages should be provided for the new communication. In some embodiments, this information could be used by the query posing unit 308 to pose an appropriate query to one or both of the individuals as the communication is being setup.

The information in the user information database 303 may also indicate that whenever information about a past language translation setting for a previous communication between first and second individuals is available, that information should be used to automatically establish the same language translation setting for any future communications that are setup between the first and second individuals. In this instance, if information about a language translation setting is available from past communications between first and second individuals, each time that a new communication is established between the first and second individuals there would be no need to try to determine the languages likely spoken by the first and second individuals, and there would be no need to pose any queries to either of the individuals. Instead, a language translation setting for the new communication could be rapidly established based on the information stored in the user information database 303.

The language translation setting unit 300 may also include a country code and language database 314. The country code and language database 314 could be utilized by the information obtaining unit 302 or the language determining unit 304 to determine the language that is likely spoken by a user of a telephony device. In particular, once the telephone number and/or country code for a particular telephony device has been determined, the language determining unit 304 could consult the country code and language database 314 to determine the language predominantly spoken within that country. Similarly, once the location of a telephony device has been determined, information in the country code and language database 314 could be used to determine the language predominantly spoken at that location.

In alternate embodiments, the language determining unit 304 or the information obtaining unit 302 could utilize third party databases that contains information about the languages spoken in different countries or in different locations. This could include a database that identifies the countries associated with certain telephone numbers and country codes, and/or a database that identifies the languages predominantly spoken within certain countries or location.

Figure 4:
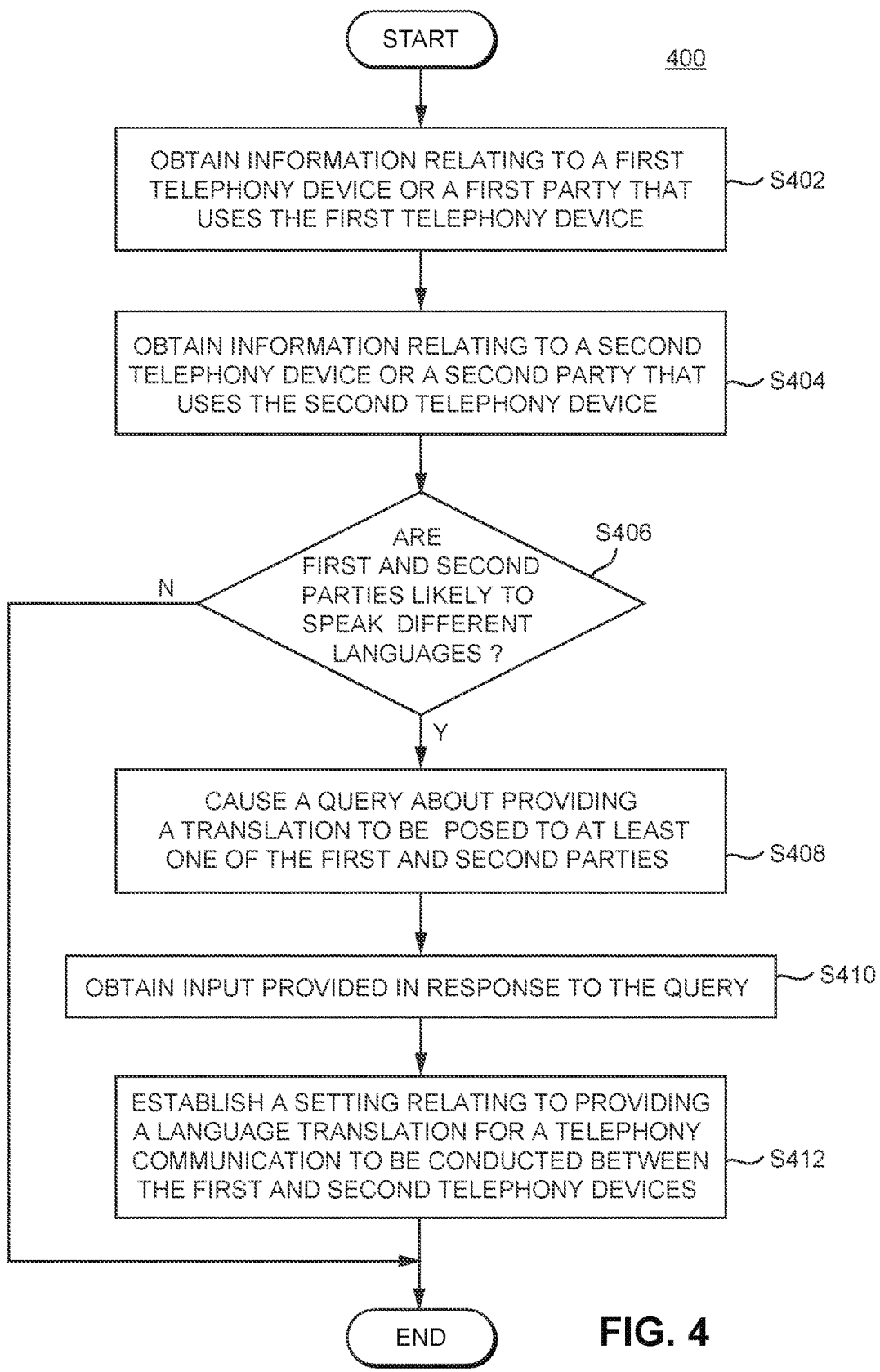
FIG. 4 is a flow diagram illustrating steps of a method that may be performed by a language translation setting unit to notify one or both parties to a telephony communication that translation services can be provided and to establish a setting relating to providing a language translation based on input received from one or both parties.

FIG. 4 illustrates steps of a method for establishing a setting relating to a language translation for a telephony communication. The method 400 starts and proceeds to step S402 where an information obtaining unit 302 obtains information relating to a first telephony device and/or a first party that uses the first telephony device. As explained above, this information could include the telephone number and/or country code associated with the first telephony device. This information could include information about a location of the first telephony device. Such location information could be obtained from a GPS unit of the telephony device, or through other means. The obtained information could also include a language setting of the telephony device, or an operating system of the first telephony device. The information could also include a time zone setting of the first telephony device. Moreover, the information could include a preferred language setting of a telephony software application resident on the first telephony device that will be used to conduct the telephony communication. Of course, the information obtained by the information obtaining unit 302 could take other forms and be derived for other sources.

The method then proceeds to step S404 where the information obtaining unit 302 obtains information relating to a second telephony device that will conduct a telephony communication with the first telephony device, or a second party that uses the second telephony device. The information obtained relating to the second telephony device or the second party could be any one of the items discussed above in connection with the first telephony device.

The method then proceeds to step S406 where the language determining unit 304 determines whether the first and second parties are likely to speak different languages. As noted above, this step would be performed by determining the languages likely spoken by the first and second parties based upon the information gathered during steps S402 and S404. In alternate embodiments, the determination made in step S406 may be based, in whole or in part, on information obtained from a user information database 303, as explained above.

If the language determining unit 304 determines that the first and second parties likely speak the same language, then the method ends, and no query about language translation services is ever posed to the parties.

If the language determining unit determines that the first and second parties likely speak different languages, the method proceeds to step S408 where a query unit 306, and specifically a query posing unit 308, causes a query about providing translation services to be posed to at least one of the first and second parties. In many embodiments, the query would be posed only to the first party who is initiating the telephony communication. In other embodiments, the query posing unit 308 could pose queries individually to both the first and second parties. In some other embodiments, the query posing unit 308 could pose a query to only the second party who is receiving the telephony communication.

The query that is posed to either or both of the first and second parties would ask whether the party is interested in receiving language translation services for the telephony communication. The query could be specific about the two languages which will be involved in the translation. For example, the query could ask the first party if the first party would like a translation to be performed between English and French. Such a query would be posed when the language determining unit 304 determines that the first party likely speaks English and the second party likely speaks French. If the query posing unit 308 were to pose a query to the second party under these circumstances, the query would ask whether the second party wishes for a translation to be performed between French and English.

The query that is posed to either or both of the first and second parties may also be based on information in the user information database 303. For example, in some embodiments, a setting for an individual may indicate that a query should always be posed, even if prior communications between the same two parties involved a translation from a first to a second language. Alternatively, a setting for an individual may indicate that a query should be posed to the individual in order to confirm that a translation is desired, however, information about previous a language translation that was previously performed for a communication between the two individuals may be used to format the query.

The query posing unit 308 could cause the query to be performed in multiple different fashions. In some embodiments, the query posing unit 308 could cause a spoken query to be played to either or both of the first and second parties. In alternate embodiments, the query posing unit could cause a text or graphical query to be displayed on the display screens of either or both of the first and second telephony devices. In some other embodiments, the query could be posed using both audio output and textual or graphical output on a display screen.

The method then proceeds to step S410 where the response interpretation unit 310 of the query unit 306 obtains input provided by either or both of the first and second parties in response to the query that has been posed. User responses could be provided in multiple different ways. In some embodiments, the response interpretation unit 310 could receive spoken input from one or both of the first and second parties. Alternatively, the response interpretation unit 310 could receive input which is provided by one or both of the first and second parties depressing one or more keys of a keypad on a telephony device. In yet other embodiments, one or both of the first and second parties could make a selection using a selection device such as a pointer, a touch sensitive display screen, or a mouse to select one of multiple predetermined responses to a query which have been displayed to a party on a display screen.

The response interpretation unit 310 then interprets the responses that the party or parties have provided. In the case of a spoken response, the response interpretation unit 310 could utilize speech recognition techniques to determine what the party said in their response. In some embodiments, the response interpretation unit 310 could utilize the services of a separate element which provides speech recognition capabilities.

The method would then proceed to step S412 where a setting unit 312 establishes a setting relating to language translation services for the telephony communication. The setting that is established could indicate that no translation services are to be provided. Alternatively, the setting that is established could indicate that a translation is to be provided, and the setting could identify the two languages for the translation.

In other embodiments, the setting that is established by the setting unit 312 could also indicate the type of translation services that are to be provided in greater detail. For example, the setting could indicate that an audio translation that is to be provided back and forth between the two parties. In this instance, each party would hear a translated version of what the other party originally said. In alternative embodiments, the setting could indicate that a transcript of the telephony conversation to be displayed to either or both of the parties in specific languages. The transcript could be all in a language which the party viewing a transcript speaks. Alternatively, the transcript could include both language versions of what each party speaks.

The setting established by the setting unit 312 could also identify how textual transcriptions of the translations are to be provided to a party. For example, the setting could indicate that the first party is to receive a transcript of the translations on a display screen of the telephony device, whereas the second party is to receive transcribed translations in text (SMS) messages or via email messages. Once the setting has been established in step S412, the method ends.

In steps S402 and S404 of the method described above, information is obtained relating to the telephony devices or to the two parties. While certain types of information have been identified above, the identification of certain types of information should no way be considered limiting. The information obtaining unit 302 could obtain various other forms of information which will be indicative of the language spoken by one or both of the parties to the telephony communication.

In addition, step S412 of the above described method indicates that a setting relating to providing language translation services is established. As also discussed above, the way in which the translation services are to be provided to one or both of the parties could be set in step S412. However, the specific types of translation services and the ways in which the translation services are provided to the parties that are discussed above should in no way be considered limiting. Other types of translation services could also be provided, and the translation services could be provided to the parties in other ways.

In some embodiments, when a language translation setting is established for a communication between first and second parties, the parties may be provided with a notification or information about how to terminate translation services partway through the communication. In some embodiments, either or both of the parties could terminate an ongoing translation service by issuing a termination command. The termination command could be issued by entering a particular key sequence on a keypad of a telephony device, by speaking certain commands, or by other means.

Figure 5:
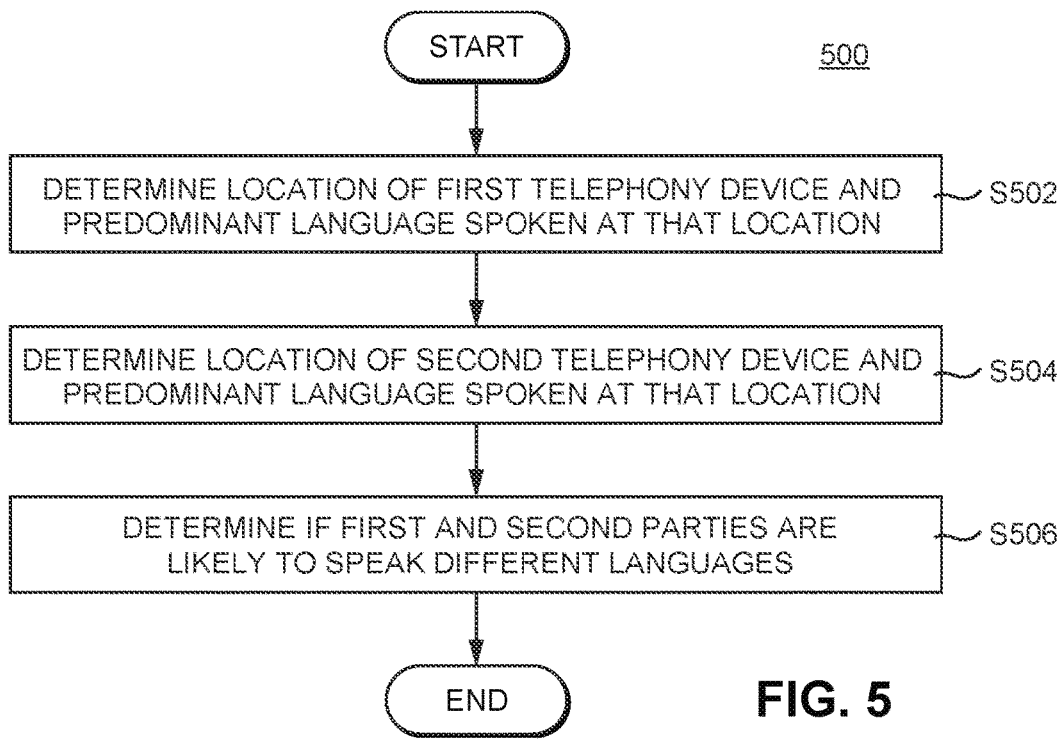
FIG. 5 is a flow diagram that illustrates steps of a first method that could be performed by a language determining unit to determine if first and second parties to a telephony communication are likely to speak different languages.

FIG. 5 illustrates steps of a method that could be performed in order to accomplish step S406 of the method described above in connection with FIG. 4. In other words, the steps illustrated in FIG. 5 would be performed utilizing information obtained in steps S402 and S404 of the method illustrated in FIG. 4 to determine if the first and second parties are likely to speak different languages.

The method 500 begins and proceed to step S502 where the language determining unit 304 determines the location of the first telephony device, as well as the predominant language spoken at that location. The location of the telephony device could be determined based on any of the elements of information discussed above. The predominant language spoken at that location could be determined by reference to the country code and language database 314 illustrated in FIG. 3, or via a separate database or databases that indicates that predominant languages spoken in various different locations throughout the world. This language will be assumed to be the language likely spoken by the first party that uses the first telephony device.

The method then proceeds to step S504 where the language determining unit 304 determines the location of the second telephony device, and the predominant language spoken at that location. This step would be performed in the same way as discussed above in connection with step S502.

The method then proceeds to step S506 where the language determining unit 304 determines if the first and second parties are likely to speak different languages based on the determinations made in steps S502 and S504. The method then ends.

Figure 6:
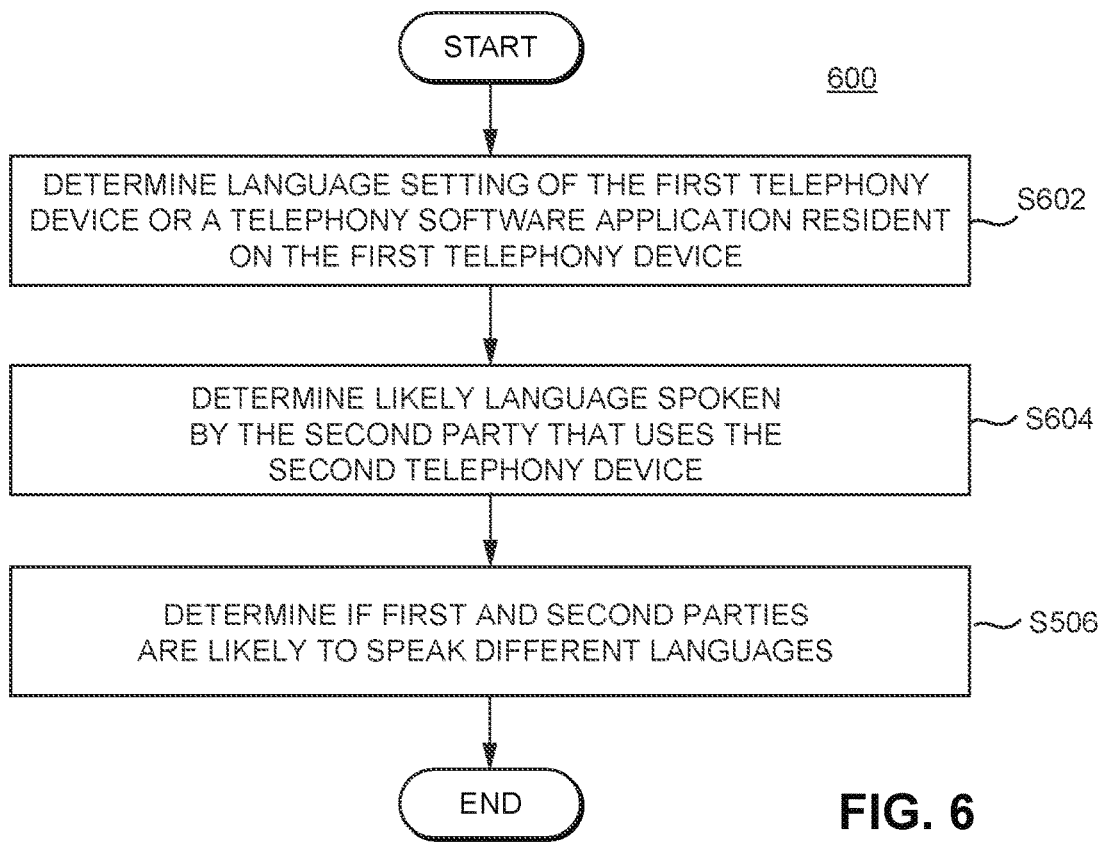
FIG. 6 is a flow diagram that illustrates steps of a second method that could be performed by a language determining unit to determine if first and second parties to a telephony communication are likely to speak different languages.

FIG. 6 illustrates steps of an alternate method that could be performed by the language determining unit 304 to accomplish step S406 of the method illustrated in FIG. 4. The method 600 begins and proceeds to step S602 where the language determining unit 304 determines a language setting of the first telephony device, or a language setting of a telephony software application resident on the first telephony device based on information obtained by the information obtaining unit 302. This will be assumed to be the language likely spoken by the first party that uses the first telephony device.

The method then proceeds to step S604 where the language determining unit 304 determines the language likely spoken by the second party that uses the second telephony device. Step S604 could be performed using any of the various methods discussed above utilizing information obtained by the information obtaining unit 302. The method then proceeds to step S606 where the language determining unit 304 determines if the first and second parties are likely to speak different languages. The method then ends.

Figure 7:
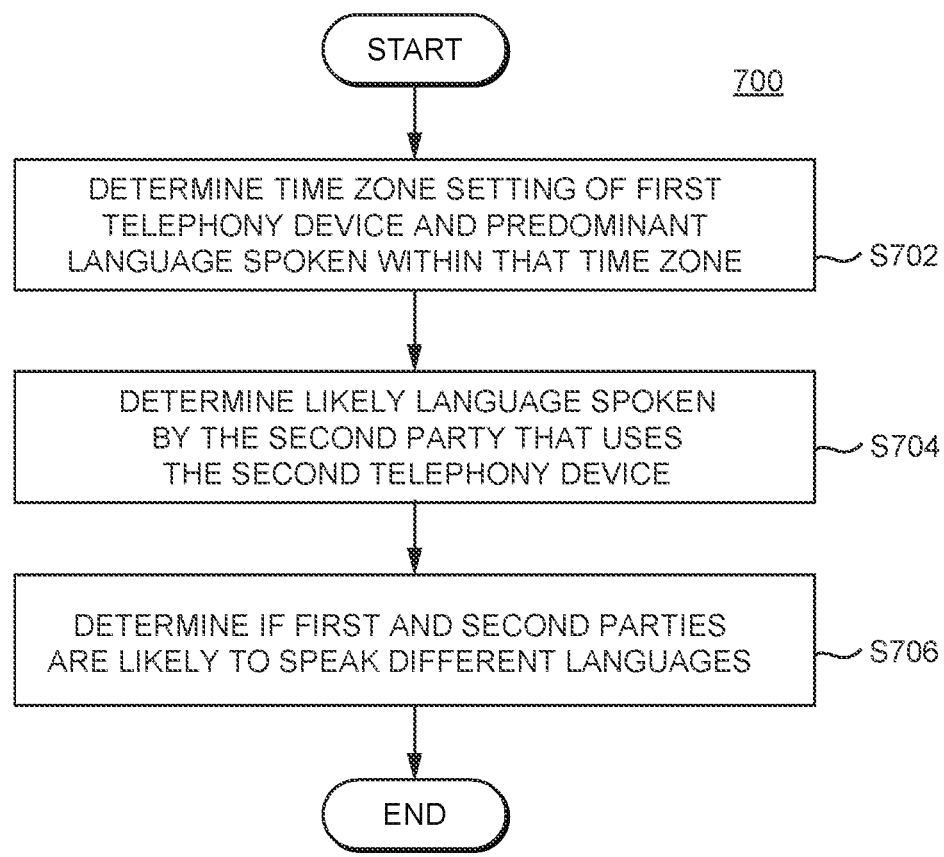
FIG. 7 is a flow diagram that illustrates steps of a third method that could be performed by a language determining unit to determine if first and second parties to a telephony communication are likely to speak different languages.

FIG. 7 illustrates yet another way in which the language determining unit 304 could accomplish step S406 of the method illustrated in FIG. 4. The method 700 begins and proceeds to step S702 where the language determining unit 304 determines a time zone setting of the first telephony device, and the predominant language spoken within that time zone. The time zone setting could be determined utilizing information obtained from the first telephony device via the information obtaining unit 302. The language predominantly spoken within that time zone will be assumed to the language likely spoken by the first party using the first telephony device. This language could be determined utilizing information from the country code and language database 314, or from some other third party database.

The method then proceeds to step S704 where the language determining unit 304 determines the language likely spoken by the second party that uses the second telephony device. This step could be performed using any of the methods discussed above via information obtained by the information obtaining unit 302. The method then proceeds to step S706 where the language determining unit 304 determines if the first and second parties are likely to speak different languages. The method then ends.

In methods performed by the language determining unit 304, the type information used to determine the language spoken by the first party can be different from the type of information used to determine the language likely spoken by the second party.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the technology should in no way be considered limiting.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method performed by at least one server of a telephony system for establishing a setting for a telephony communication that will be conducted between a first telephony device that is used by an initiating party to initiate the setup of the telephony communication and a second telephony device that is used by a receiving party that will receive the telephony communication, comprising:

obtaining information relating to at least one of the first telephony device and/or the initiating party that uses the first telephony device with at least one server of the telephony system;

obtaining information relating to at least one of the second telephony device and/or the receiving party that uses the second telephony device with at least one server of the telephony system;

determining with at least one server of the telephony system whether the initiating and receiving parties are likely to speak different languages based on the obtained information;

causing a query to be posed to the initiating party when it is determined that the initiating and receiving parties are likely to speak different languages, the query asking if the initiating party would like a language translation to be performed as the telephony communication between the first and second telephony devices is conducted;

receiving input from the initiating party that is provided in response to the query; and establishing a setting relating to a language translation for the telephony communication based on the input received in response to the query.

2. The method of claim 1, wherein the step of obtaining information relating to at least one of the first telephony device and the initiating party that uses the first telephony device comprises obtaining a telephone number assigned to the first telephony device.

3. The method of claim 2, wherein the obtained telephone number includes a country code.

4. The method of claim 1, wherein the step of obtaining information relating to at least one of the first telephony device and the initiating party that uses the first telephony device comprises obtaining information about a location of the first telephony device.

5. The method of claim 1, wherein the step of obtaining information relating to at least one of the first telephony device and the initiating party that uses the first telephony device comprises determining a language setting of an operating system of the first telephony device.

6. The method of claim 1, wherein the step of obtaining information relating to at least one of the first telephony device and the initiating party that uses the first telephony device comprises determining a time zone setting of the first telephony device.

7. The method of claim 1, wherein the step of obtaining information relating to at least one of the first telephony device and the initiating party that uses the first telephony device comprises obtaining a preferred language setting of a telephony software application resident on the first telephony device that will be used to conduct the telephony communication.

8. The method of claim 1, wherein causing a query to be posed to the initiating party comprises asking if the initiating party would like a translation to be performed between a first language and a second language as the telephony communication between the first and second telephony devices is conducted, wherein the identity of the first language stated in the query is based on the information obtained from at least one of the first telephony device and the initiating party that uses the first telephony device, and wherein the identity of the second language stated in the query is based on information obtained from at least one of the second telephony device and the receiving party that uses the second telephony device.

9. The method of claim 1, wherein causing a query to be posed to the initiating party comprises causing the query to be posed to the initiating party in a language that is selected based on the obtained information relating to at least one of the first telephony device and the initiating party that uses the first telephony device.

10. The method of claim 1, further comprising:
causing a second query to be posed to the receiving party, the second query asking whether the receiving party would like a language translation to be performed as the telephony communication between the first and second telephony devices is conducted.

11. The method of claim 1, wherein receiving input from the initiating party comprises receiving spoken audio input from the initiating party.

12. A system for establishing a setting for a telephony communication that will be conducted between a first telephony device that is used by an initiating party to initiate the setup of a telephony communication and a second telephony device that is used by a receiving party that will receive the telephony communication comprising:
means for obtaining information relating to at least one of the first telephony device and/or the initiating party that uses the first telephony device, and for obtaining information relating to at least one of the second telephony device and/or the receiving party that uses the second telephony device;
means for determining whether the initiating and receiving parties are likely to speak different languages based on the information obtained by the obtaining means;
means for causing a query to be posed to the initiating party when it is determined that the initiating and receiving parties are likely to speak different languages, the query asking if the initiating party would like a language translation to be performed as the telephony communication between the first and second telephony devices is conducted, and for receiving input from the initiating party that is provided in response to the query; and
means for establishing a setting relating to a language translation for the telephony communication based on the input received by the causing means.

13. A system for establishing a setting for a telephony communication that will be conducted between a first telephony device that is used by an initiating party to initiate the setup of a telephony communication and a second telephony device that is used by a receiving party that will receive the telephony communication, comprising:
an information obtaining unit comprising at least one processor that is configured to obtain information relating to at least one of the first telephony device and/or the initiating party that uses the first telephony device, and to obtain information relating to at least one of the second telephony device and/or the receiving party that uses the second telephony device;
a determining unit comprising at least one processor that is configured to determine whether the initiating and receiving parties are likely to speak different languages based on the information obtained by the information obtaining unit;
a query unit comprising at least one processor that is configured to cause a query to be posed to the initiating party when it is determined that the initiating and receiving parties are likely to speak different languages, the query asking if the initiating party would like a language translation to be performed as the telephony communication between the first and second telephony devices is conducted, wherein the query unit also receives input from the initiating party that is provided in response to the query; and
a setting unit comprising at least one processor that is configured to establish a setting relating to a language translation for the telephony communication based on the input received by the query unit.

14. The system of claim 13, wherein the information obtaining unit obtains a telephone number assigned to the first telephony device.

15. The system of claim 14, wherein the information obtaining unit also obtains a country code associated with the first telephony device.

16. The system of claim 13, wherein information obtaining unit obtains information about a location of the first telephony device.

17. The system of claim 13, wherein the information obtaining unit obtains information regarding a language setting of an operating system of the first telephony device.

18. The system of claim 13, wherein the information obtaining unit obtains information indicative of a time zone setting of the first telephony device.

19. The system of claim 13, wherein the information obtaining unit obtains information indicative of a preferred language setting of a telephony software application resident on the first telephony device that will be used to conduct the telephony communication.

20. The system of claim 13, wherein query unit causes a query to be posed to the initiating party asking if the initiating party would like a translation to be performed between a first language and a second language as the telephony communication between the first and second telephony devices is conducted, wherein the identity of the first language stated in the query is based on information obtained from at least one of the first telephony device and the initiating party that uses the first telephony device, and wherein the identity of the second language stated in the query is based on information obtained from at least one of the second telephony device and the receiving party that uses the second telephony device.

21. The system of claim 13, wherein the query unit causes the query to be posed to the initiating party in a language that is selected based on obtained information relating to at least one of the first telephony device and the initiating party that uses the first telephony device.

22. The system of claim 13, wherein the query unit also causes a second query to be posed to the receiving party, the second query asking whether the receiving party would like a language translation to be performed as the telephony communication between the first and second telephony devices is conducted.

23. The system of claim 13, wherein the receiving unit receives spoken audio input from the initiating party.

* * * * *